United States Patent [19]
Kim

[11] Patent Number: 5,920,676
[45] Date of Patent: Jul. 6, 1999

[54] APPARATUS AND METHOD FOR REMOVING NOISE BAR

[75] Inventor: Chul-min Kim, Anyang, Rep. of Korea

[73] Assignee: Samsung Electronics Co., Ltd., Kyungki-do, Rep. of Korea

[21] Appl. No.: 08/840,755

[22] Filed: Apr. 16, 1997

[30] Foreign Application Priority Data

Apr. 16, 1996 [KR] Rep. of Korea ............ 96-11449
Apr. 17, 1996 [KR] Rep. of Korea ............ 96-11621

[51] Int. Cl.⁶ .................................................. H04N 5/91
[52] U.S. Cl. .............................. 386/69; 386/76; 386/78; 360/72.1; 360/72.3; 360/75
[58] Field of Search .................................. 386/6, 14, 21, 386/68, 69, 76, 77, 78, 79, 80, 86, 87, 81; 360/71, 72.1, 72.2, 72.3, 70, 64, 73.01, 73.04, 77.01, 75, 77.12

[56] References Cited

U.S. PATENT DOCUMENTS

| | | | |
|---|---|---|---|
| 5,319,500 | 6/1994 | Yu | 360/70 |
| 5,359,462 | 10/1994 | Park et al. | 360/64 |
| 5,684,916 | 11/1997 | Hong | 386/68 |

*Primary Examiner*—Wendy Garber
*Assistant Examiner*—Christopher Onuaku
*Attorney, Agent, or Firm*—Sughrue, Mion, Zinn, Macpeak & Seas, PLLC

[57] ABSTRACT

A reproduction control apparatus and method in a video cassette recorder (VCR) reduces for reducing noise generated during a high-speed search of a picture in the VCR. In the reproduction control method in a forward high-search mode, it is determined whether or not a command for the forward high-speed search mode is input by a user. Then, if a user inputs a command for the forward high-speed search mode, the capstan motor is controlled to transfer the tape at a predetermined multiple speed. Next, the drum motor is controlled to increase the rotation speed of the drum to maintain a traveling angle which a composite vector of the rotation velocity vector of the drum and the tape velocity vector makes with the tape velocity vector at the traveling angle in a normal playback mode. Therefore, the tape traveling angle is maintained at that in the normal playback mode, and a clean picture having no noise bar can be obtained.

15 Claims, 7 Drawing Sheets

TAPE TRAVELING DIRECTION
IN REVERSE SEARCH MODE

FIG. 8A

DRUM ROTATION SPEED

θ

TAPE TRAVELING SPEED

FIG. 8B

FIG. 8C

APPARATUS AND METHOD FOR REMOVING NOISE BAR

BACKGROUND OF THE INVENTION

1. Field of the Invention

The present invention relates to a servo control method for a video signal recorder/reproducer and an apparatus therefor. More particularly, the present invention relates to a reproduction control method in a video cassette recorder (VCR) which reduces noise generated during a high-speed search of a picture in the VCR, and an apparatus therefor. Additionally, the present invention relates to an apparatus and a method for removing a noise bar adopting the tape reproduction control apparatus.

2. Description of the Related Arts

Generally, a head gap of a video cassette recorder (VCR) is arranged on a drum such that the recorded pattern made by a head is not perpendicular to the video track of a tape, but rather forms an angle with the direction across the video track of a tape, which is called an azimuth angle. In a VHS system, the azimuth angle is 60°. Furthermore, two video heads mounted on opposite sidse of the drum result in azimuth angles having the same magnitude but opposite directions. When playing back the video tape, the azimuth angles cause the signal read out from adjacent tracks to be zero due to a misalignment loss.

In a normal playback mode, each of the two video heads reads a magnetic pattern of one field recorded on each track reads a magnetic pattern of one field recorded on each track of the video tape exactly, since the reproducing head is parallel to the recorded pattern during the playback while traveling the video track of the tape with a traveling angle determined by the rotating speed of the drum assembly and the traveling speed of the tape under the control of a drum motor and a capstan motor. That is, each video head traces the corresponding track exactly according to the standard traveling angle, so that there is no generation of a noise bar on a screen.

However, during a high-speed search of a signal recorded on the tape, the traveling speed of the tape is greatly changed while the rotation speed of the drum is not changed. Accordingly, the traveling angle is changed from that of the normal playback mode, so that the video head does not travel along just a single track. As a result, a noise bar is displayed on the screen, since adjacent tracks have azimuth angles of opposite direction.

Figure 4:
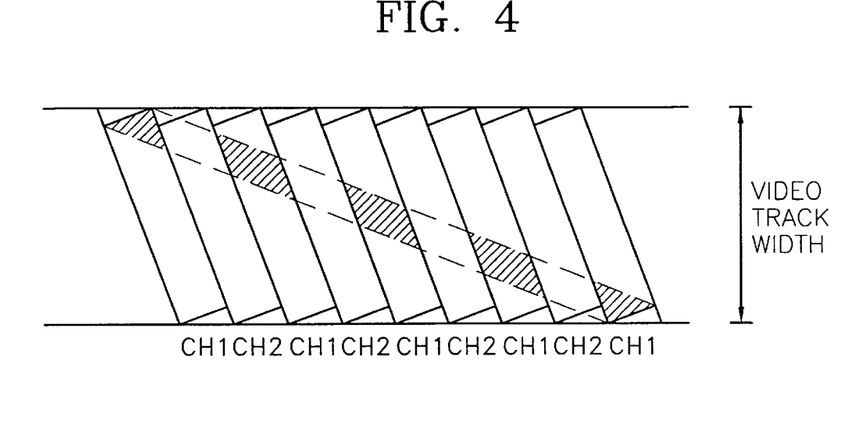
FIG. 4 illustrates a trace of a video head on a tape during the forward high-speed search mode in a VCR.
Figure 7:
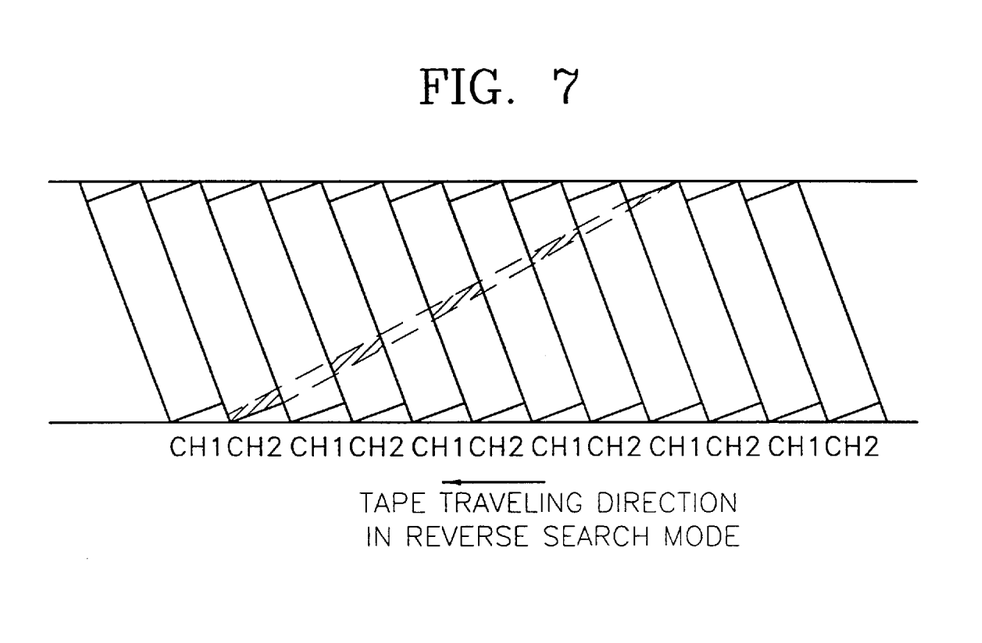
FIG. 7 illustrates a trace of a video head on a tape during the reverse search mode in a VCR.

The reason for the generation of the noise bar during the high-speed search mode will be described with reference to FIGS. 4 and 7.

First, during a forward high-speed search mode, the traveling angle is decreased to a value which is smaller than that during the normal playback mode, since the traveling speed of the tape is increased while the rotation speed of the drum on which video heads are mounted does not change. Thus, the video head travels over a plurality of tracks. For example, when a video head of channel 2 reproduces a signal from a video track of channel 1 which is the hatched portion in FIG. 4, the reproduced signal results in a noise component due to the difference in the azimuth angles.

Also, during a reverse search mode, the traveling angle is changed from that during the normal playback mode, since the traveling direction of the tape is changed by 180° and the traveling speed thereof is changed without a change in the rotation speed of the drum. Thus, when the video head of channel 1 reproduces a signal from the video track of channel 2, which is the hatched portion of FIG. 7, the reproduced signal results in a noise component due to the difference in the azimuth angle.

As described above, in the conventional VCR, the change of the traveling angle according to the change in the relative speed between the rotation speed of the drum and the traveling speed of the tape during the high-speed search mode is not compensated, which results in a noise bar on the screen.

SUMMARY OF THE INVENTION

To solve the problems above, one object of the present invention is to provide a reproduction control method in a video cassette recorder (VCR) which reduces noise generated during a high-speed search of a picture in the VCR by compensating for the change in the traveling angle, and an apparatus therefor.

Another object of the present invention is to provide an apparatus and method for removing a noise bar during a search mode by using the reproduction control apparatus and editing a video signal before the video signal is output to a display.

As an aspect of the present invention to solve one of the objects above, there is provided a reproduction control method in a forward high-search mode in a video signal recorder/reproducer having a drum motor for rotating a drum on which a video head is mounted and a capstan motor for transferring a tape, comprising the steps of: (a) determining whether a command for the forward high-speed search mode is input by a user or not; (b) controlling the capstan motor to transfer the tape at a predetermined multiple speed if it is determined that the command for the forward high-speed search mode is input in the step (a); and (c) controlling the drum motor for increasing a rotation speed of the drum to maintain a traveling angle which a composite vector of a rotation velocity vector of the drum and a tape velocity vector makes with the tape velocity vector at the traveling angle in a normal playback mode.

As another aspect of the present invention to solve one of the objects above, there is provided a reproduction control apparatus for a video signal recorder/reproducer having a drum motor for rotating a drum on which a video head is mounted, a capstan motor for transferring a tape, and a control head for reading out a control signal recorded on a control track of the tape, comprising: a control signal detector for detecting the control signal read out by the control head and generating a control pulse signal in response to the control signal; a drum pulse generator for detecting a rotation speed of the drum motor and generating a drum pulse signal of which frequency is proportional to the rotation speed of the drum motor; a controller for receiving the control pulse signal and the drum pulse signal from the control signal detector and the drum pulse generator, respectively, and generating a first drum control signal for increasing the rotation speed of the drum motor and a capstan control signal for increasing a tape transferring speed in response to the control pulse signal and the drum pulse signal in a fast high-speed search mode in order to maintain a traveling angle which a composite vector of a rotation velocity vector of a drum and a tape velocity vector makes with the tape velocity vector at the traveling angle in the normal playback mode; a capstan motor driver for controlling the rotation speed of the capstan motor in response to the capstan control signal; and a drum motor driver for controlling the rotation speed of the drum motor in response to the drum control signal.

As an aspect of the present invention to solve another one of the objects above, there is provided a noise bar removing apparatus for a video signal recorder/reproducer having a drum motor for rotating a drum on which a video head is mounted, a capstan motor for transferring a tape, and a control head for reading out a control signal recorded on a control track of the tape, comprising: a control signal detector for detecting the control signal read out by the control head and generating a control pulse signal in response to the control signal; a drum pulse generator for detecting a rotation speed of the drum motor and generating a drum pulse signal of which the frequency is proportional to the rotation speed of the drum motor; a controller for receiving the control pulse signal and the drum pulse signal from the control signal detector and the drum pulse generator, respectively, and generating a first drum control signal for increasing the rotation speed of the drum motor and a capstan control signal for increasing a tape transferring speed in response to the control pulse signal and the drum pulse signal in a fast high-speed search mode in order to maintain a traveling angle which a composite vector of a rotation velocity vector of a drum and a tape velocity vector makes with the tape velocity vector at the traveling angle in the normal playback mode; a capstan motor driver for controlling the rotation speed of the capstan motor in response to the capstan control signal; a drum motor driver for controlling the rotation speed of drum motor in response to the drum control signal; a demodulator for demodulating a modulated video signal read out by the video head and outputting the demodulated video signal; a sync signal detector for detecting a sync signal in the demodulated video signal and outputting the sync signal; a video signal controller for receiving the sync signal output by the sync signal detector and a mode selection signal input by a user, and generating a read address signal, a corrected sync signal and a switching control signal; a video memory for converting the demodulated video signal output by the demodulator into a digital video data, storing the digital video data in a frame unit, and editing the digital video data by skipping the digital video data frames according to a search speed to output the digital video data in a frame unit in response to the read address signal; a digital-to-analog (D/A) converter for converting the digital video data into an analog video signal, and mixing the analog video signal with the corrected sync signal output by the video signal controller to output the mixed result; and a switch for receiving the demodulated video signal output by the demodulator and the signal output by the D/A converter, and selectively outputting one of such signals in accordance with the switching control signal, wherein the switch outputs the signal output by the D/A converter in the forward high-speed search mode and the demodulated video signal output by the demodulator in an operation mode other than the forward high-speed search mode.

As another aspect of the present invention to achieve another one of the objects above, there is provided a noise bar removing method in a reverse search mode in a video signal recorder/reproducer having a drum motor for rotating a drum on which a video head is mounted, a capstan motor for transferring a tape, and a control head for reading out a control signal recorded on a control track of the tape, comprising the steps of: (a) determining whether or not a command for the reverse search is input by a user; (b) controlling the capstan motor to transfer the tape at a predetermined multiple speed in a reverse direction when the command for the reverse search is input in the step (a); (c) controlling the drum motor for changing a rotation speed of a drum to make a traveling angle which a composite vector of a rotation velocity vector of the drum and a tape velocity vector makes with the tape velocity vector different from the traveling angle in a normal playback mode by 180°; (d) storing a video signal reproduced from the tape by use of a video head mounted on the drum; (e) reading out the stored video signal in the reverse sequence in which it was stored, editing the read-out video signal at a predetermined multiple speed, and outputting the edited digital video signal; and (f) converting the edited digital video signal into an analog video signal and outputting the analog video signal.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

A preferred embodiment of the present invention will be described by dividing the operation mode into a forward high-speed search mode and a reverse search mode.

First, a reproduction control method during a forward high-speed search mode will be described.

Figure 1:
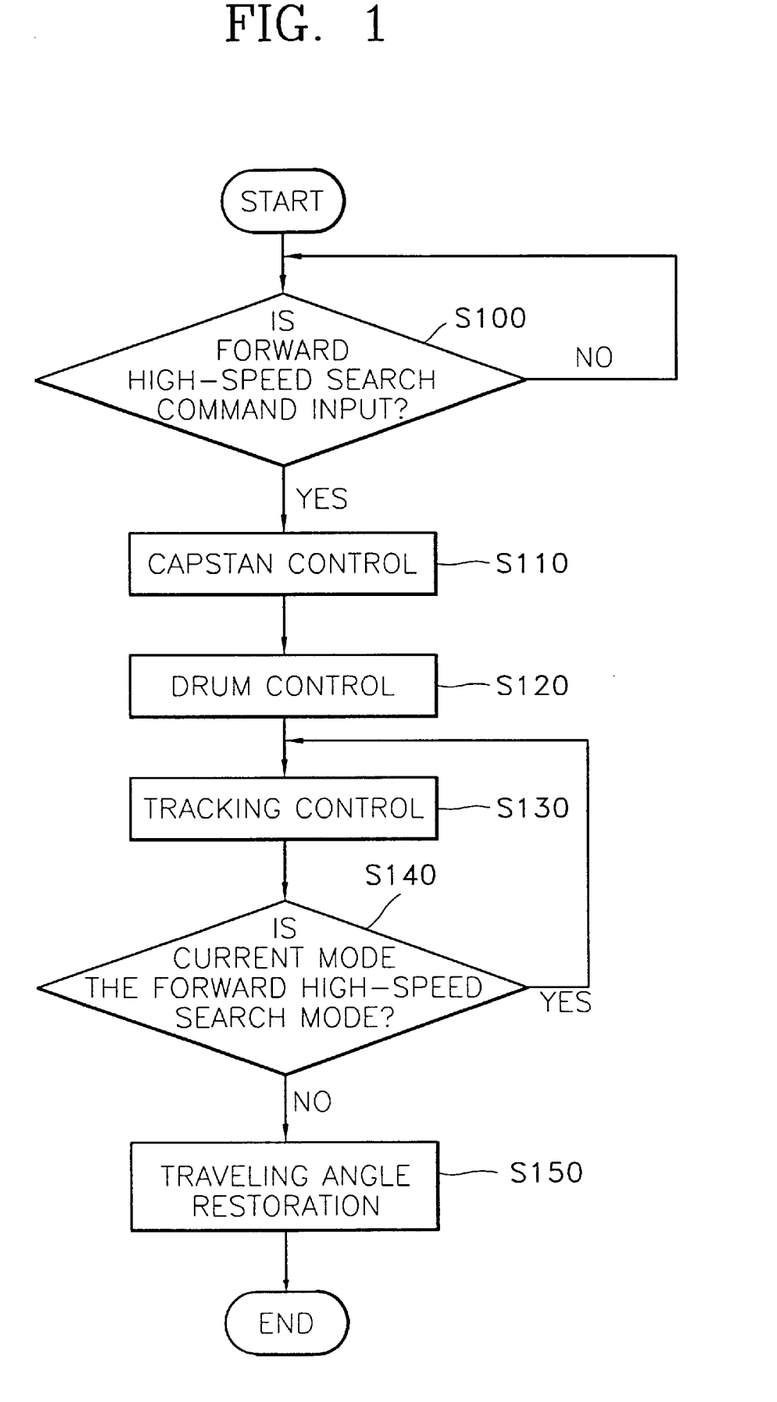
FIG. 1 is a flowchart outlining a reproduction control method according to the present invention during a forward high-speed search mode.

In step S100, it is determined whether a command for the forward high-speed search operation is input by a user. If the command is not input, step S100 is repeatedly carried out.

If it is determined that the command for the forward high-speed search operation is input in the step S100, a capstan control step S110 is carried out to transfer a tape at a predetermined speed, which is faster than that of the normal playback mode. To control the capstan, a control signal recorded in a control track of the tape is read out, and then a driving voltage of a capstan motor is adjusted so that the period of the control signal is decreased from that of the normal playback mode by the reciprocal of a ratio of the above predetermined speed and the speed in the normal playback mode.

In an alternative of the present embodiment, a capstan pulse signal whose frequency is proportional to the rotating speed of the capstan motor is generated by use of a Hall-effect sensor, and then the driving voltage of the capstan motor is adjusted so that the period of the capstan pulse signal is decreased from that of the normal playback mode by the reciprocal of the ratio of the above predetermined speed and the speed in the normal playback mode.

After the capstan control step S110 or simultaneously therewith, a drum control step S120 is performed, in which a traveling angle is adjusted by controlling the rotation speed and angle of a drum during the forward high-speed search mode. In the step S120, the rotation speed of the drum is increased from that during the normal playback mode, so that the traveling angle of a video head on a tape is maintained at the same value as that of the normal playback mode. Thus, the video head can read a signal without deviating from the track of its own field. Also, if the rotation angle of the drum is adjusted to a level which is greater than that of the normal playback mode together with controlling of the rotation speed of the drum, the rotation speed of the drum required to control the traveling angle can be lowered as compared with the case where only the rotation speed is controlled.

The drum control step S120 will now be described in detail with reference to FIGS. 5A and 5B.

Figure 5A:
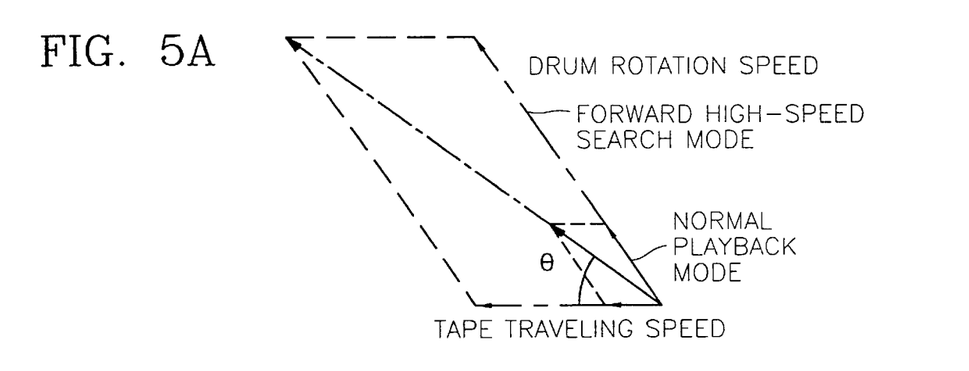
FIGS. 5A and 5B are vector diagrams showing the directions of the traveling speed of the tape and the rotation speed of the drum which determine the traveling angle during the forward high-speed search mode.

FIG. 5A is a vector diagram which illustrates the traveling speed of the tape and the rotation speed of the drum in the normal playback mode and the traveling speed of the tape and the rotation speed of the drum in the forward high-speed search mode in the case that only the rotation speed of the drum is changed to control the traveling angle.

In FIG. 5A, vectors expressed by solid lines represent the traveling speed of the tape and the rotation speed of the drum in the normal playback mode, and vectors expressed by dotted lines represent the traveling speed of the tape and the rotation speed of the drum in the high-speed search mode. Also, θ denotes a traveling angle in the normal playback mode.

As can be seen in FIG. 5A, the traveling speed of the tape in the high-speed search mode is larger than that in the normal playback mode. If the rotation speed of the drum is not changed while the traveling speed of the tape is increased, the traveling angle θ will decrease. However, if the rotation speed of the drum is changed together with the traveling speed of the tape, the traveling angle can be maintained at θ and no noise bar is generated on the screen.

Figure 5B:
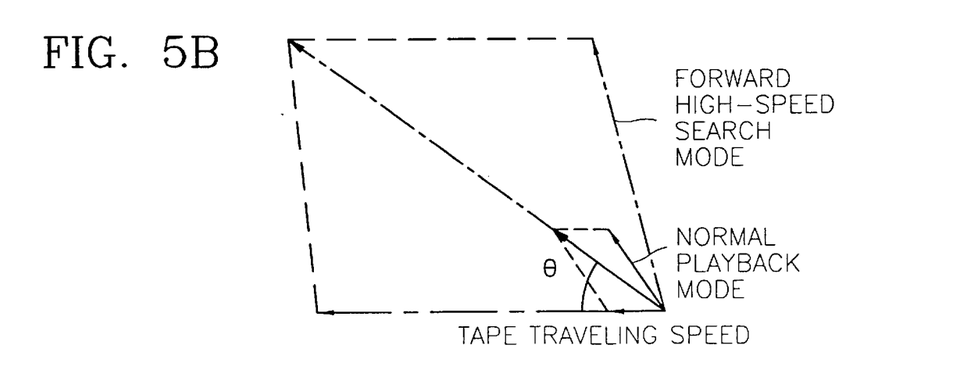

FIG. 5B is a vector diagram which illustrates the traveling speed of the tape and the rotation speed of the drum in the normal playback mode and the traveling speed of the tape and the rotation speed of the drum in the forward high-speed search mode in the case that the rotation angle of the drum is changed along with the rotation speed of the drum to control the traveling angle.

In FIG. 5B, vectors expressed by solid lines represent the traveling speed of the tape and the rotation speed of the drum in the normal playback mode, and vectors expressed by dotted lines represent the traveling speed of the tape and the rotation speed of the drum in the high-speed search mode. Also, θ denotes a traveling angle in the normal playback mode.

As can be seen in FIG. 5B, the traveling speed of the tape in the high-speed search mode is larger than that in the normal playback mode. If the rotation speed of the drum is not changed while the traveling speed of the tape is increased, the traveling angle θ will be decreased. However, if the rotation speed of the drum is changed together with the traveling speed of the tape, the traveling angle can be maintained at θ and no noise bar is generated on the screen.

If the rotation angle of the drum is increased along with the rotation speed thereof during the forward playback search mode as shown in FIG. 5B, the traveling angle θ is maintained constant at a lower rotation speed of the drum than in the case of FIG. 5A. Thus, the burden of increasing the rotation speed of the drum motor is mitigated. Also, if both the rotation speed and angle of the drum are controlled, the searching speed can be increased compared with the case in which only the rotation speed of the drum is controlled.

After the rotation speed and angle of the drum are adjusted in the step S120, a frequency-modulated (FM) video signal read out by a video head is sampled, and then the traveling speed of the tape and the rotation speed of the drum are precisely controlled so that the average of the sampled signals reaches the maximum level in a tracking control step S130. Thus, a signal-to-noise ratio is increased and the amplitude of an envelope of the video signal is at a maximum level In step S140, it is determined whether the current operation mode is the forward high-speed search mode or not. If it is verified in the step S140 that the current mode is still the forward high-speed search mode, the tracking control step S130 is repeated.

Meanwhile, if the current mode is not the forward high-speed search mode, the rotation speed and angle of the drum is restored to that in the normal playback mode.

As described above, in the present invention, the rotation speed and angle of the drum during the forward high-speed search mode are controlled so that a relative traveling angle of the video head with respect to the tape is maintained to be that in the normal playback mode, and the noise bar is not displayed on the screen.

Figure 2:
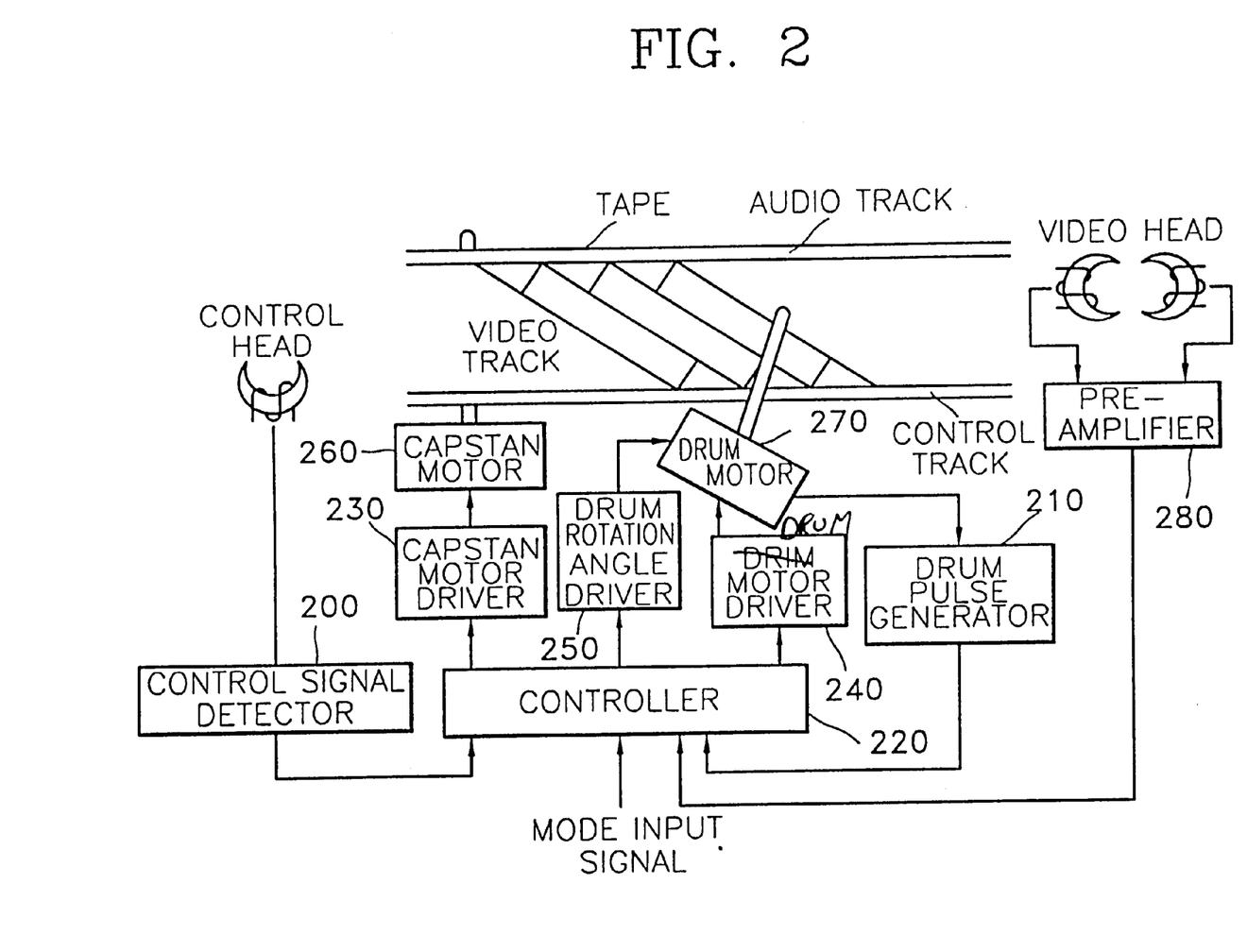
FIG. 2 is a schematic diagram of a reproduction control apparatus according to the present invention.

FIG. 2 is a schematic diagram of an embodiment of a reproduction control apparatus according to the present invention. The apparatus of FIG. 2 includes a control signal detector 200, a drum pulse generator 210, a controller 220, a capstan motor driver 230, a drum motor driver 240, a drum rotation angle driver 250, a capstan motor 260, a drum motor 270 and a pre-amplifier 280.

The control signal detector 200 detects the control signal read out from the control track of the video tape by a control head and generates a control pulse signal in response to the control signal.

The drum pulse generator 210 detects the rotation speed of the drum by use of a Hall-effect sensor and generates a drum pulse signal having a frequency which is proportional to the rotation speed of the drum.

The controller 220 receives the control pulse signal and the drum pulse signal from the control signal detector 200 and the drum pulse generator 210, respectively, and generates a capstan control signal, a first drum control signal and a second drum control signal to drive the capstan motor driver 230, the drum motor driver 240 and the drum rotation angle driver 250, respectively, in response to the control pulse signal, the drum pulse signal and a mode input signal, so that the traveling angle between the vectors of the tape traveling speed and the rotating speed of the drum is maintained constant.

The capstan motor driver 230 receives the capstan control signal from the controller 220 and controls the capstan motor 260 which transports the tape to change the tape traveling speed so that the period of the control signal from the control head varies in reciprocity with the speed in the normal playback mode. Here, the reduction in the period of the control signal results in increasing of the tape traveling speed to a predetermined multiple speed which is faster than that of the normal playback mode.

The drum motor driver 240 receives the first drum control signal from the controller 220 and controls the drum motor 270 in response to the first drum control signal so that the rotation speed of the drum is increased to a level which is higher than that in the normal playback mode.

The drum rotation angle driver 250 receives the second drum control signal from the controller 220 and controls the rotation angle of the drum in response to the second drum control signal so that the traveling angle in the forward high-speed search mode is maintained at that in the normal playback mode.

That is, when the forward high-speed search mode begins, the rotation speed of the drum is increased and the rotation angle of the drum is changed simultaneously or after the adjustment of the rotation speed, so that the traveling angle in the forward high-speed search mode is maintained constant. Alternatively, the rotation angle of the drum is increased first to a level which is obtained through an experiment, and then the rotation speed of the drum is controlled to finely control the traveling angle.

When a mode control signal to convert the operation mode back to the normal playback mode is input, the controller 220 generates the capstan control signal, the first drum control signal and the second drum control signal to the capstan motor driver 230, the drum motor driver 240 and the drum rotation angle driver 250, respectively, so that the capstan motor 260 restores the tape transport speed of the normal playback mode and the traveling angle between the vectors of the tape traveling speed and the rotating speed of the drum is maintained constant.

on the other hand, in order to precisely control the traveling angle during the forward high-speed search mode, a tracking control may be performed, so that a video head of channel 1 traces a track of the channel 1 and a video head of channel 2 traces a track of the channel 2 exactly.

To carry out the tracking control, the pre-amplifier 280 amplifies a modulated video signal which is read out by the video heads and applies the amplified signal to the controller 220. The controller 220 detects an envelope of the amplified video signal and samples the envelope signal to continuously control the average of the sampling values to be at its maximum value while precisely changing the tape transport speed.

The tracking control improves the signal-to-noise ratio.

Figure 3:
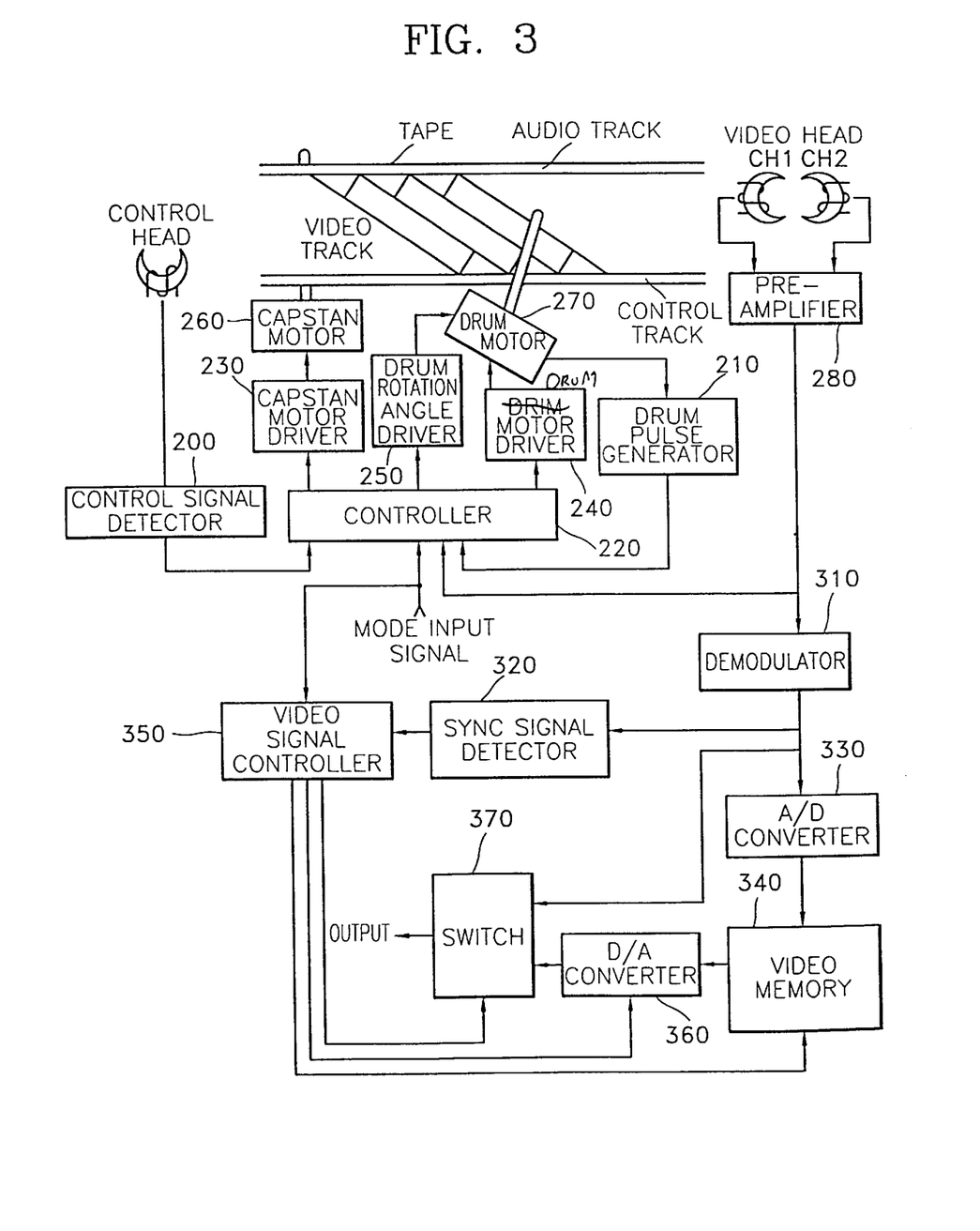
FIG. 3 is a schematic diagram of a noise bar removing apparatus according to the present invention.

FIG. 3 is a schematic diagram of a noise bar removing apparatus according to the present invention. Some of the components of the apparatus shown in FIG. 3 are similar to the components of the apparatus shown in FIG. 2. Accordingly, the same reference numerals are designated to those components and the description of such components will be omitted.

The noise bar removing apparatus of FIG. 3 includes a demodulator 310, a sync signal detector 320, an analog-to-digital (A/D) converter 330, a video memory 340, a video signal controller 350, a digital-to-analog (D/A) converter 360 and a switch 370.

The demodulator 310 receives the amplified modulated video signal output by the pre-amplifier 280 and demodulates such signal.

The sync signal detector 320 detects a synchronization (sync) signal in the demodulated video signal and outputs the sync signal.

The A/D converter 330 converts the demodulated video signal output by the demodulator 310 into digital video data.

The video memory 340 receives the digital video data output by the A/D converter 330, stores such data in a frame unit and outputs the digital video data by a frame unit according to a read address signal.

The video signal controller 350 generates control signals for each signal processing block according to a mode input signal. Specifically, the video signal controller 350 generates the read address signal and outputs such signal to the video memory 340 so that the memory 340 outputs the digital video data in a frame unit according to the read address signal. Here, the video signal controller 350 generates the read address signal such that the video memory 340 outputs the digital video data in a frame unit by skipping the frames corresponding to the playback speed.

Also, the video signal controller 350 receives the sync signal output by the sync signal detector 320 and delays such signal by a signal processing time elapsed in the A/D converter 330 and the video memory 340 to generate a corrected sync signal. Furthermore, the video signal controller 350 generates and outputs a switching control signal according to the operation mode.

The D/A converter 360 converts the digital video data into an analog video signal, mixes the analog video signal with the corrected sync signal output by the video signal controller 350, and then outputs the mixed result.

The switch 370 receives the demodulated video signal output by the demodulator 310 and the signal output by the D/A converter 360, and selects one of such signals in accordance with the switching control signal to output the selected signal. The signal output by the D/A converter 360 is selected by the switch 370 in the forward high-speed search mode while the demodulated video signal output by the demodulator 310 is selected in the other operation mode.

As described above, if the signal detected by the video head is stored in the video memory to be read out by skipping the frames corresponding to the playback speed and the read-out signal is output together with a corrected sync signal, a clean picture with no noise bars can be displayed during the high-speed forward search mode.

Next, the method for removing the noise bar using the noise bar removing apparatus according to the present invention will be described for a reverse high-speed search mode.

Figure 6:
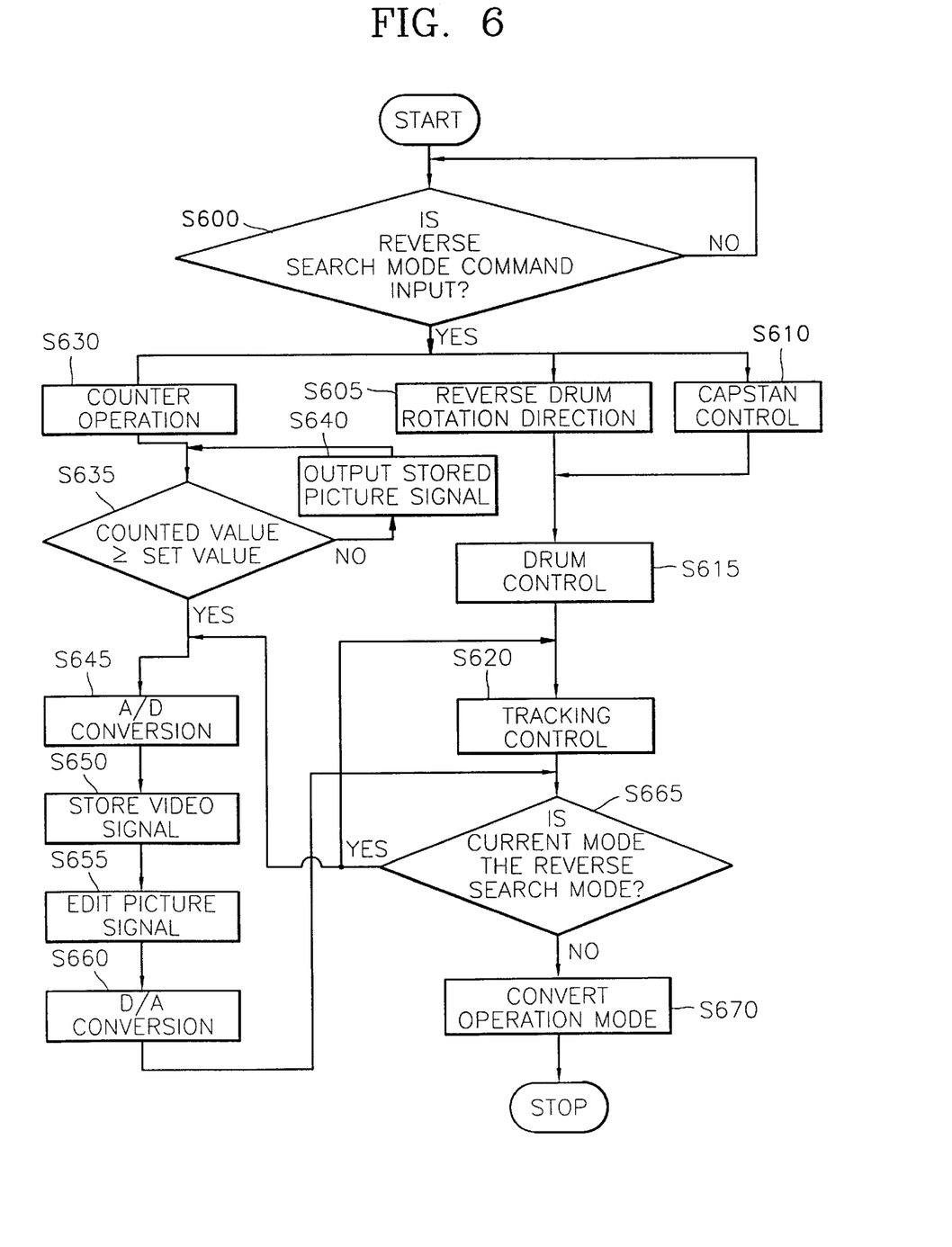
FIG. 6 is a flowchart outlining a noise bar removing method during a reverse search mode according to the present invention.

FIG. 6 is a flowchart outlining the method for removing the noise bar during the reverse high-speed search mode.

In step S600, it is determined whether a command for the reverse search operation is input by a user. If the command is not input, step S600 is repeatedly carried out.

When the command is input in the step S600, the rotational direction of the drum is reverse with respect to that of the normal playback mode (S605). That is, the rotation of the drum is stopped, and then the drum is rotated backward at the same speed as that of the normal playback mode.

Along with the step S605, a capstan control step (S610) is carried out simultaneously to transfer the tape in a predetermined multiple speed, which is typically faster than that of the normal playback mode, in a reverse direction. To control the capstan, a control signal recorded in a control track of the tape is read out, and then a driving voltage of a capstan motor is adjusted so that the period of the control signal is decreased from that of the normal playback mode by the reciprocal of the above predetermined multiplicity of the speed.

Alternatively, a capstan pulse signal whose frequency is proportional to the rotating speed of the capstan motor is generated by use of a Hall-effect sensor, and then the driving voltage of the capstan motor is adjusted so that the period of the capstan pulse signal is decreased from that of the normal playback mode by the reciprocal of the above predetermined multiplicity of the speed.

After the rotation direction of the drum is reversed in the step S605 and the transferring of the tape is controlled in the step S610, a drum control step S615 is performed, in which the rotation speed and direction of the drum are controlled such that the traveling angle is adjusted to be a value rotated by 180° from that during the normal playback mode.

The drum control step S615 will now be described in detail with reference to FIGS. 8A to 8C.

Figure 8A:
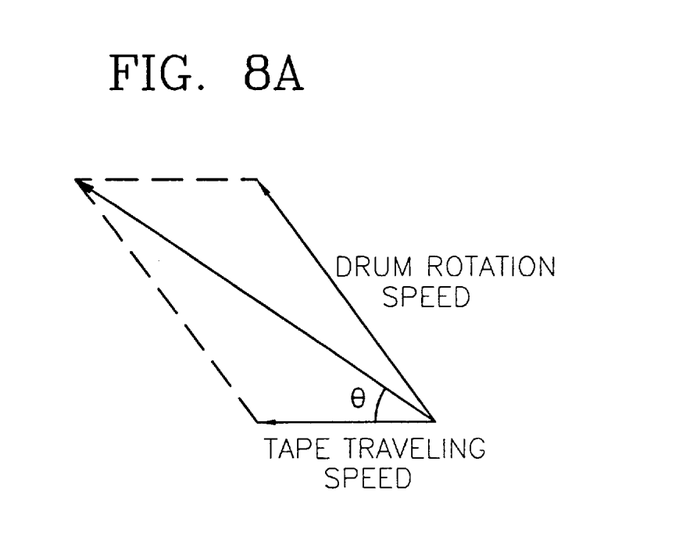
FIGS. 8A to 8C are vector diagrams showing the directions of the traveling speed of the tape and the rotation speed of the drum which determine the traveling angle during the reverse search mode.

FIG. 8A illustrates the traveling angle θ, which is defined by the traveling speed of the tape and the rotating speed of the drum, during the normal playback mode. FIG. 8B illustrates the traveling angle 74'during the reverse search mode, which is defined by the traveling speed of the tape and the rotating speed of the drum during the reverse search mode which are expressed by dotted lines, compared with that during the normal playback mode.

Figure 8B:
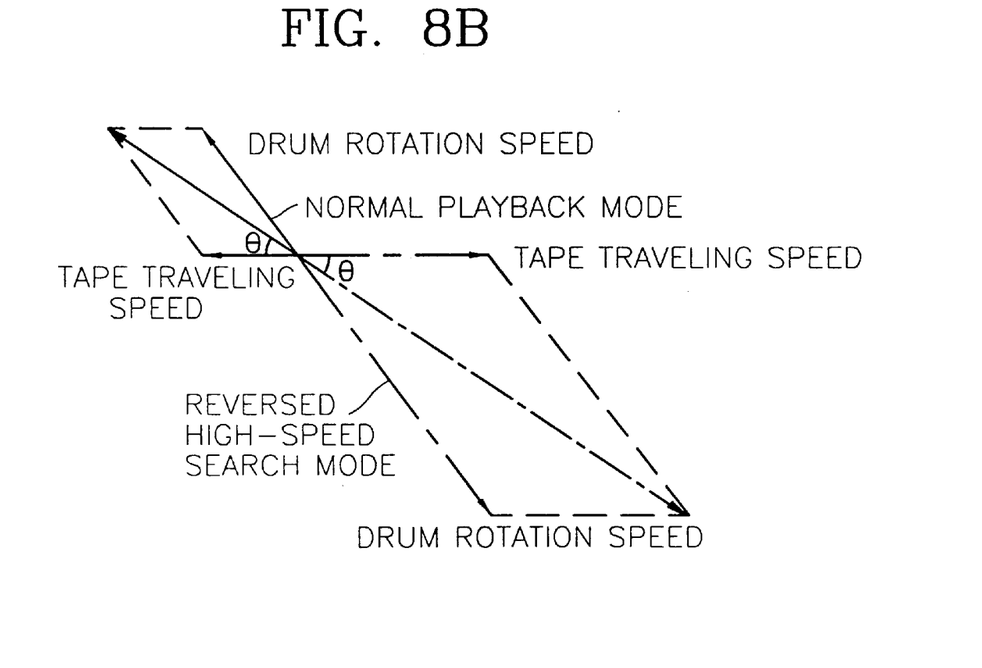

As can be seen in FIG. 8B, if only the backward traveling speed of the tape is increased without changing the rotation speed of the drum, the tape traveling angle will be different from that during the normal playback mode. Accordingly, the rotation speed of the drum is adjusted along with the change of the tape traveling speed so that the tape traveling angle is maintained at a value rotated by 180° from that during the normal playback mode in the present invention.

Figure 8C:
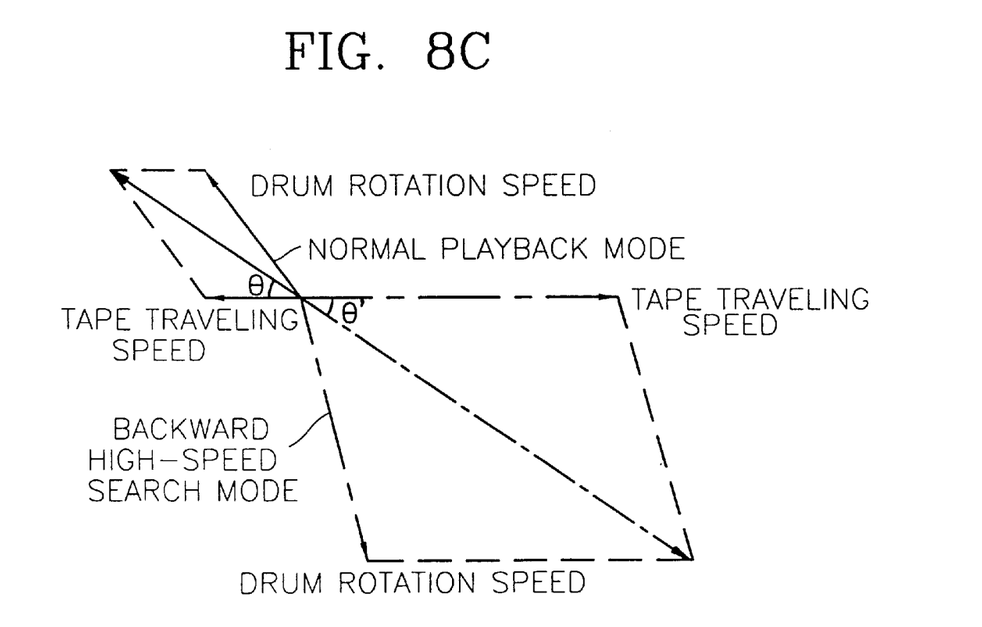

FIG. 8C illustrates the tape traveling speed and the rotating speed of the drum which define the traveling angle θ in the case that the rotation angle and the rotation speed of the drum are changed simultaneously to control the traveling angle.

Unlike the case described with reference to FIG. 8B where only the rotation speed of the drum is changed during the reverse high-speed search mode, if the rotation angle of the drum is increased along with the rotation speed thereof, the tape traveling angle can be maintained constant at a lower rotation speed of the drum than the case of FIG. 8B. Since the burden of increasing the rotation speed of the drum motor is mitigated, the searching speed can be increased compared with the case in which only the rotation speed of the drum is controlled.

After the rotation speed and angle of the drum are adjusted in the step S615, a video signal read out by a video head is sampled, and then the traveling speed of the tape and the rotation speed of the drum are precisely controlled so that the average of the sampled signals reaches the maximum level in a tracking control step S620. Accordingly, a signal-to-noise ratio is increased.

On the other hand, the following video control steps are performed when the command for the reverse search mode is input.

When a command for the reverse search operation is input by a user in the step S600, a counting operation is initiated by use of a counter from the timing on which the command is input (S630).

Then, the counted value is compared with a set value which indicates a duration of time required for stabilizing the servo after the operation mode is converted (S635).

If the counted value is less than the set value in the step S635, which implies that the duration of time required for stabilizing the servo has not elapsed after the operation mode is converted, a video signal which was stored in a memory during the normal playback mode in a frame unit is output on the screen (S640). Thus, the instability of the picture caused by the unstable servo control in the initial stage of the mode conversion can be compensated for. Here, the stored picture is a plurality of frames. Alternatively, a single frame of picture may be displayed repetitively.

After the servo stabilization, the modulated video signal read out by the video head is demodulated, and then the demodulated analog video signal is converted into a digital video data (S645).

In step S650, the digital video data is encoded and the encoded video data is stored in a video memory in a frame unit by designating the address of the memory by a frame unit.

Afterwards, the stored video data is read out while being edited (S655). Specifically, the stored video data is skipped by as much as the number of frames corresponding to the multiple speed of the reverse search mode, and then read out in the reverse sequence of the storing sequence. As a result, the video signal is reproduced at the same traveling angle as that of the normal playback mode.

In step S660, the edited digital video data is converted into an analog video signal. When the analog video signal is displayed on a screen, a clean picture with few noise bars can be obtained during the reverse search mode.

Meanwhile, after the steps S615 and S660, it is determined whether the current operation mode is the reverse search mode or not in step S665. If it is verified in the step S665 that the current mode is still the reverse search mode, the tracking control step S620 and the video control steps S645 to S660 are repeated.

If it is determined in the step S665 that the current operation mode is not the reverse search mode, the operation mode is checked and the rotation of the drum and the capstan motor is controlled according to the operation mode.

Also, it is preferable to edit the picture stored in the video memory for a predetermined time period in order to output a stable picture during the initial stage of the mode conversion from the reverse search mode to the operation mode other than the reverse search mode.

As described above, the present invention controls the rotation speed and the rotation angle of the drum which determine the tape traveling angle during the high-speed search modes, and processes the video signal in digital form. As a result, a clean picture with little noise bar distortion can be obtained.

After the rotation speed and angle of the drum are adjusted, a video signal read out by a video head is sampled, and then the traveling speed of the tape and the rotation speed of the drum are precisely controlled so that the average of the sampled signals reaches the maximum level in a tracking control step. Accordingly, a signal-to-noise ratio is increased.

What is claimed is:

1. In a video signal recorder/reproducer having a drum motor for rotating a drum on which a video head is mounted and a capstan motor for transferring a tape, a reproduction control method in a forward high-search mode comprising the steps of:

(a) determining whether or not a command for the forward high-speed search mode is input by a user;

(b) controlling the capstan motor to transfer the tape at a predetermined multiple speed if it is determined that the command for the forward high-speed search mode is input in said step (a); and (c) controlling the drum motor for increasing a rotation speed of the drum to maintain a traveling angle which a composite vector of a rotation velocity vector of the drum and a tape velocity vector makes with the tape velocity vector at the traveling angle in a normal playback mode.

2. A reproduction control method as claimed in claim 1, wherein said step (c) comprises a step of:

changing a rotation angle of the drum motor to maintain the traveling angle which the composite vector of the rotation velocity vector of the drum and the tape velocity vector makes with the tape velocity vector at the traveling angle in the normal playback mode.

3. A reproduction control method as claimed in claim 1, further comprising a step of:

controlling tracking of a video head on the tape by maximizing an average of a signal read out from the tape.

4. A reproduction control apparatus for a video signal recorder/reproducer having a drum motor for rotating a drum on which a video head is mounted, a capstan motor for transferring a tape, and a control head for reading out a control signal recorded on a control track of the tape, comprising:

a control signal detector for detecting the control signal read out by said control head and generating a control pulse signal in response to the control signal;

a drum pulse generator for detecting a rotation speed of said drum motor and generating a drum pulse signal having a frequency which is proportional to the rotation speed of said drum motor;

a controller for receiving the control pulse signal and the drum pulse signal from said control signal detector and said drum pulse generator, respectively, and generating a first drum control signal for increasing the rotation speed of said drum motor and a capstan control signal for increasing a tape transferring speed in response to the control pulse signal and the drum pulse signal in a fast high-speed search mode in order to maintain a traveling angle which a composite vector of a rotation velocity vector of a drum and a tape velocity vector makes with the tape velocity vector at the traveling angle in the normal playback mode;

a capstan motor driver for controlling the rotation speed of said capstan motor in response to the capstan control signal; and a drum motor driver for controlling the rotation speed of the drum motor in response to said first drum control signal.

5. A reproduction control apparatus as claimed in claim 4, further comprising:

a drum rotation angle driver for changing a rotation angle of said drum to maintain the traveling angle, wherein said controller generates a second drum control signal for increasing the rotation speed of said drum motor, and said drum rotation angle driver controls the rotation angle of said drum in response to the second drum control signal.

6. A reproduction control apparatus as claimed in claim 4, wherein said controller comprises:

a tracking controller for controlling tracking of a video head on the tape by maximizing an average of a signal read out from the tape.

7. A noise bar removing apparatus for a video signal recorder/reproducer having a drum motor for rotating a drum on which a video head is mounted, a capstan motor for transferring a tape, and a control head for reading out a control signal recorded on a control track of the tape, comprising:

a control signal detector for detecting the control signal read out by said control head and generating a control pulse signal in response to the control signal;

a drum pulse generator for detecting a rotation speed of said drum motor and generating a drum pulse signal having a frequency which is proportional to the rotation speed of said drum motor;

a controller for receiving the control pulse signal and the drum pulse signal from said control signal detector and said drum pulse generator, respectively, and generating a first drum control signal for increasing the rotation speed of said drum motor and a capstan control signal for increasing a tape transferring speed in response to the control pulse signal and the drum pulse signal in a fast high-speed search mode in order to maintain a traveling angle which a composite vector of a rotation velocity vector of a drum and a tape velocity vector makes with the tape velocity vector at the traveling angle in the normal playback mode;

a capstan motor driver for controlling a rotation speed of said capstan motor in response to the capstan control signal;

a drum motor driver for controlling the rotation speed of the drum motor in response to the drum control signal;

a demodulator for demodulating a modulated video signal read out by said video head and outputting the demodulated video signal;

a sync signal detector for detecting a sync signal in the demodulated video signal and outputting the sync signal;

a video signal controller for receiving the sync signal output by said sync signal detector and a mode selection signal input by a user, and generating a read address signal, a corrected sync signal and a switching control signal;

a video memory for converting the demodulated video signal output by the demodulator into digital video data, storing the digital video data in a frame unit, and editing the digital video data by skipping portions of the digital video data according to a search speed to output the digital video data in a frame unit in response to the read address signal;

a digital-to-analog (D/A) converter for converting the edited digital video data into an analog video signal, and mixing the analog video signal with the corrected sync signal output by said video signal controller to output a mixed result signal; and a switch for receiving the demodulated video signal output by said demodulator and the mixed result signal output by said D/A converter, and selectively outputting one of the demodulated video signal and the mixed result signal in accordance with the switching control signal, wherein said switch outputs the mixed result signal output by said D/A converter in the forward high-speed search mode and the demodulated video signal output by said demodulator in an operation mode other than the forward high-speed search mode.

8. A noise bar removing apparatus as claimed in claim 7, wherein the read address signal output by said video signal controller addresses said video memory such that digital video data frames equal in number to a corresponding predetermined multiple speed are skipped in the forward high-speed search mode.

9. In a video signal recorder/reproducer having a drum motor for rotating a drum on which a video head is mounted, a capstan motor for transferring a tape, and a control head for reading out a control signal recorded on a control track of the tape, a noise bar removing method in a reverse search mode comprising the steps of:

(a) determining whether or not a command for the reverse search is input by a user;

(b) controlling the capstan motor to transfer the tape at a predetermined multiple speed in a reverse direction when the command for the reverse search is input in said step (a);

(c) controlling the drum motor for changing a rotation speed of the drum to make a reverse search mode traveling angle which a composite vector of a rotation velocity vector of the drum and a tape velocity vector makes with the tape velocity vector, said reverse search traveling angle being different from the traveling angle in a normal playback mode by 180°;

(d) storing a video signal reproduced from the tape by use of a video head mounted on the drum;

(e) reading out the stored video signal in digital form in a reverse sequence in which it was stored, editing the read-out digital video signal at a predetermined multiple speed, and outputting the edited digital video signal; and (f) converting the edited digital video signal into an analog video signal and outputting the analog video signal.

10. A noise bar removing method as claimed in claim 9, wherein said step (c) comprises the steps of:

(c1) changing a rotation direction of the drum to the reverse direction of that of the normal playback mode; and (c2) changing the rotation speed and an angle of the drum to make the reverse search traveling angle different from the traveling angle in a normal playback mode by 180°.

11. A noise bar removing method as claimed in claim 9, wherein said step (c) comprises a step of:

controlling tracking of a video head on the tape by maximizing an average of a signal read out from the tape.

12. A noise bar removing method as claimed in claim 9, wherein said step (c) comprises the steps of:

(c1) changing the rotation speed and an angle of the drum by predetermined amounts corresponding to the reverse search mode; and (c2) adjusting the reverse search traveling angle precisely by controlling a tracking of a video head on the tape.

13. A noise bar removing method as claimed in claim 9, wherein, in said step (e), the reading-out and the editing of the stored video signal are performed simultaneously by skipping frames equal in number to the predetermined multiple speed of the reverse search mode while reading out the stored video signal in the reverse sequence in which it was stored.

14. A noise bar removing method as claimed in claim 9, wherein in said step (e), the stored video signal is edited and output until the reverse search mode becomes stable when the operation mode is converted from a first operation mode other than the reverse search mode into the reverse search mode.

15. A noise bar removing method as claimed in claim 9, wherein, in said step (e), the stored video signal is edited and output until a first operation mode becomes stable when the operation mode is converted from the reverse search mode into the first operation mode other than the reverse search mode.

* * * * *